(12) United States Patent
Wu et al.

(10) Patent No.: US 9,148,672 B2
(45) Date of Patent: Sep. 29, 2015

(54) METHOD AND APPARATUS FOR RESIDUE TRANSFORM

(71) Applicant: MEDIATEK INC., Hsin-Chu (TW)

(72) Inventors: Tung-Hsing Wu, Chiayi (TW); Han-Liang Chou, Hsinchu (TW); Kun-Bin Lee, Taipei (TW)

(73) Assignee: MEDIATEK INC., Hsinchu (TW)

( * ) Notice: Subject to any disclaimer, the term of this patent is extended or adjusted under 35 U.S.C. 154(b) by 129 days.

(21) Appl. No.: 13/890,088

(22) Filed: May 8, 2013

(65) Prior Publication Data

US 2014/0334724 A1    Nov. 13, 2014

(51) Int. Cl.
*G06K 9/36* (2006.01)
*H04N 19/60* (2014.01)
*H04N 19/91* (2014.01)
*H04N 19/61* (2014.01)

(52) U.S. Cl.
CPC ............. *H04N 19/60* (2014.11); *H04N 19/619* (2014.11); *H04N 19/91* (2014.11)

(58) Field of Classification Search
CPC .......... H04N 19/00775; H04N 19/105; H04N 19/117; H04N 19/176; H04N 19/186; H04N 19/523; H04N 19/527; H04N 19/593; H04N 19/61; H04N 19/86; H04N 19/05
USPC ................. 382/166, 164, 236, 233, 235, 239; 375/240.15, 240.03, 240.16, 240.24
See application file for complete search history.

(56) References Cited

U.S. PATENT DOCUMENTS

| | | | |
|---|---|---|---|
| 7,469,069 B2 * | 12/2008 | Kim et al. ..................... | 382/236 |
| 2005/0013363 A1 * | 1/2005 | Cho et al. .................. | 375/240.12 |
| 2005/0281473 A1 * | 12/2005 | Kim et al. ..................... | 382/236 |
| 2007/0281473 A1 * | 12/2007 | Clark et al. ................... | 438/667 |
| 2007/0285500 A1 * | 12/2007 | Ma et al. ..................... | 348/14.07 |
| 2011/0170599 A1 * | 7/2011 | Francois et al. .......... | 375/240.16 |
| 2011/0206116 A1 * | 8/2011 | Henocq et al. ........... | 375/240.03 |
| 2011/0222604 A1 * | 9/2011 | Yang ........................ | 375/240.16 |
| 2012/0275694 A1 * | 11/2012 | Fan ............................. | 382/164 |
| 2014/0254929 A1 * | 9/2014 | Wu et al. ...................... | 382/166 |

OTHER PUBLICATIONS

"RGB Video Coding Using Residual Color Transform", Woo-Shik Kim et al., Samsung Journal of Innovative Technology, Aug. 2005, pp. 11.*

* cited by examiner

*Primary Examiner* — Mekonen Bekele
(74) *Attorney, Agent, or Firm* — Winston Hsu; Scott Margo

(57) ABSTRACT

A method and apparatus for a multiple-channel image/video coding system are disclosed. A residue generation process is applied to the image/video data to generate residue data. A set of integer operations is applied to the residue data across the input channels to generate residue transformed data having multiple output channels. In one embodiment, the residue transformed data associated with a first output channel is related to the difference between a first residue data associated with a first input channel and a second residue data associated with a second input channel. In another embodiment, the residue transformed data associated with a second output channel is related to the second difference between a threshold and a third residue data associated with a third input channel, and wherein the threshold corresponds to the first truncated or rounded average of the first residue data and the second residue data.

24 Claims, 13 Drawing Sheets

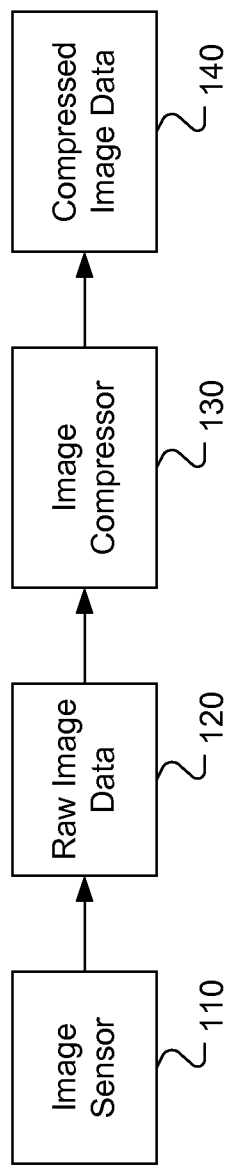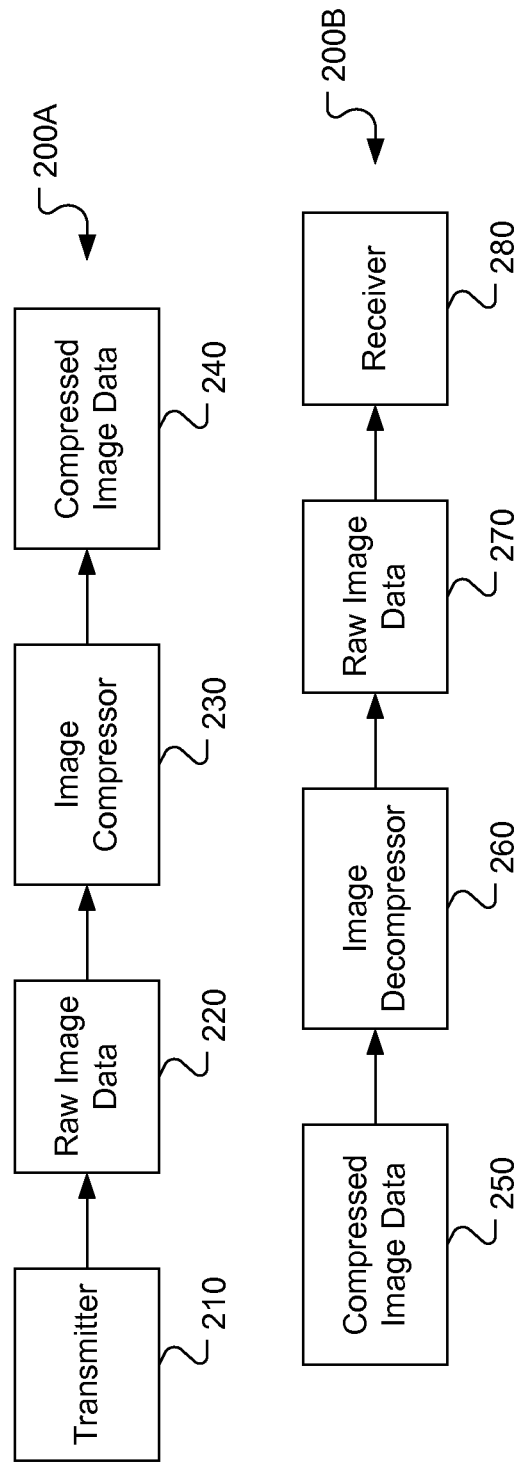

METHOD AND APPARATUS FOR RESIDUE TRANSFORM

FIELD OF THE INVENTION

The present invention relates to video coding system. In particular, the present invention relates to method and apparatus for reducing redundancy between different channels associated with residual signals.

BACKGROUND AND RELATED ART

Image compression and video compression have been widely used to reduce required storage or bandwidth associated with the respective image and video data. The underlying image or video data often comprises multiple channels. For example, in the digital camera application, a raw image is often captured using an image sensor with Red (R), Green (G) and Blue (B) color arrays. While the RGB color provides a convenient format to represent a color image or video for capture or display applications, the three color channels have to be treated equally for storage or transmission, which may not be efficient. In the field of image and video coding, various luminance/chrominance color formats are widely used, where each color format corresponds to a luminance component and two chrominance components. For example, YUV or YCrCb color format has been used in various image and video compression standards. Since the human vision is less sensitive to the chrominance signals, the chrominance signals (i.e., U/Cb and V/Cr) can be represented at lower spatial resolution with no degradation or minor degradation on the visual quality. There are also other variations of luminance/chrominance color formats. For example, the YCoCg color format disclosed in U.S. Pat. No. 7,155,055 and the reversible YUV color format disclosed in U.S. Pat. No. 6,044,172 use simplified color transform matrices so that only integer operations are used to convert signals between the RGB and the YCoCg/IntegerYUV formats. There is also a color format conversion between RGB in Bayer pattern and the YCoCg color format as disclosed in U.S. Patent Application Publication No. US2006/0083432. In typical image/video compression systems, the compression process is applied to individual luminance and chrominance channels separately.

The color conversion between a primary color format and a luminance/chrominance format involves pixel-based operations, where the conversion is represented by a set of linear equations, i.e., a conversion matrix. While the luminance/chrominance color format removes some redundancy among different channels of original image or video in the primary color format, there is still substantial amount of correlation among different channels in the luminance/chrominance color format. It is desirable to exploit the redundancy among different channels for image or video in the luminance/chrominance color format. Furthermore, it is desirable to reduce the impact on an existing image or video compression system while exploiting the redundancy among different channels.

FIG. 1 illustrates an example of image compression system such as a digital camera. Image sensor 110 is used to capture raw image data 120. Image compressor 130 receives raw image data 120 and applies image compression to generate compressed image data 140. Usually, image compression is applied to image data in a luminance/chrominance color format, such as YUV. Therefore, color conversion is performed in image compressor 130 to convert the raw image into the luminance/chrominance color format first and image compression is then applied to individual channels. FIG. 2 illustrates an example of image compression for transmission or interface applications such as MIPI (Mobile Industry Processor Interface), DSI (Display Serial Interface) and HDMI (High-Definition Multimedia Interface), Wi-Fi Display or Bluetooth. Block diagram 200A corresponds to the transmitter side, where raw image data 220 is received from transmitter 210. In the example of HDMI interface between a set-top box and an HDTV set, the transmitter corresponds to the set-top box and the receiver corresponds to the HDTV set. Image compressor 230 compresses the raw image data into compressed image data 240. The compressed image data is then transmitted over the media such as a physical cable or wireless link. Block diagram 220B corresponds to the receiver side, where compressed data 250 is received over a media. The compressed data is then decompressed by image decompressor 260 to recover raw image data 270. The recovered raw image data is then provided to the receiver for display.

FIG. 3 illustrates exemplary block diagrams of image compression systems. System 300A corresponds to a compression system based on spatial prediction. Original image 310 with three channels is processed by quantization. The original image may correspond to color pixels in the RGB format. The original image is converted to a luminance/chrominance color format such as YUV using a 3×3 conversion matrix. After matrix conversion, the result is quantized by input quantization 320 to a fixed data depth, such as 8 bits or 10 bits. Spatial prediction 330A is then applied to individual channels to generate residue data, which is then compressed by entropy coding 350A to generate compressed data. Spatial prediction is well known in the field of image and video coding. For example, the image can be divided into blocks and each block can be predicted based on neighboring blocks that have been processed. System 300B corresponds to a compression system based on frequency transform, where frequency transform 340B is applied to quantized image data. For example, discrete cosine transform (DCT) can be applied to individual channels. The transform coefficients are often quantized (the quantizer for transform coefficients is not explicitly shown in system 330B) and then coded by entropy coding 350B to generate compressed image data. The quantizer for the frequency transformed data is often used for the purpose of bit rate control. System 300C illustrates a compression system based on both spatial prediction and frequency transform, where frequency transform 340C is applied to residual signal from spatial prediction 330C. The transform coefficients are quantized (the quantizer for transform coefficients is not explicitly shown in system 330C) and then coded by entropy coding 350C to generate compressed image data. In FIG. 3, the residual signals are generated by spatial processing 330A, frequency transform 340B or both spatial prediction 330C and frequency transform 340C. Systems shown in FIG. 3 are intended to illustrate examples of generating residual signals in an image compression system. There are many other means to generate residual signals for image compression. For example, the image compression system may use wavelet or pyramid techniques to form residual signals. The invention disclosed herein is not limited to the image compression systems shown in FIG. 3.

FIG. 4 illustrates an exemplary block diagram of video compression system, where the system consists of three source data channel (410A-410C) corresponding to three input channels. The source data channels are predicted by respective Intra/Inter prediction from block 420. The residual signals (414A-414C) correspond to the differences between source data channels and respective prediction using subtractors 412A-412C. The Intra/Inter prediction process is well known in the art. For example, in the MPEG-2, H.264/AVC and the emerging High Efficiency Video Coding (HEVC) coding standards, a form of Intra/Inter prediction is used. The Intra prediction and Inter prediction is often adaptively selected for each image area such as a macroblock, a largest coding unit (LCU), a slice, or a picture. The Inter prediction may include motion estimation to exploit temporal redundancy among images in the video sequence. While the redundancy within each input channel has been reduced by the residue generation process, the residual signals (414A-414C) may not be in a form suited for entropy coding. Usually the residual signals are subject to further processing to convert the signal into symbols suited for entropy coding. For example, the residual signals are further processed by two-dimensional transform and quantization (T/Q, 450A-450C) as shown in FIG. 4. Such further processing for the encoder side is referred to as coding process in this disclosure. Accordingly, the two-dimensional transform, quantization, or a combination of both two-dimensional transform and quantization is an example of coding process. The frequency transform used for image coding, such as DCT, can be used as the two-dimensional transform for video compression. Other two-dimensional transforms, such as integer transform, may also be used to achieve high computational efficiency for video applications. The quantized transform coefficients are then compressed using entropy coder 470 to generate compressed video output. The entropy coder usually compressed data symbols into compressed bitstream. For example, the data symbols correspond to the quantized transform coefficients. It is well known in the art that the data symbols may also include other coding information.

The encoder side also needs to reconstruct the coded video in order to form prediction. Accordingly, inverse coding process has to be applied to the data symbols to recover the residual signals. For example, the quantized transform coefficients from T/Q 450A-450C are processed by inverse quantization and inverse two-dimensional transform (IQ/IT, 460A-460C) to generate recovered residual signals (444A-444C). The IQ/IT processed signals are added to the previous prediction signals from Intra/Inter prediction 420 to form reconstructed signals using adders 442A-442C. The reconstructed signals are then processed by in-loop filters 440A-440C to reduce coding artifacts before the reconstructed signals are stored in frame buffers 430A-430C for later use by Intra/Inter prediction 420. FIG. 4 illustrates an example of reconstruction loop in the encoder side to reconstruct the image or video data based on residual signals, where the reconstruction loop comprises adders (442A-442C), in-loop filters (440A-440C), frame buffers (430A-430C) and reconstruction using Intra/Inter prediction (part of block 420). However, a coding system may use different system partition. For example, the inverse quantization may also be included in the reconstruction loop in the encoder side to reconstruct the image or video data based on residual signals. In FIG. 4, the residual signals are generated from the source data channels and Intra/Inter prediction using subtractors 412A-412C. The residual signals are reproduced after T/Q 450A-450C and IQ/IT 460A-460C processing. There are many other means to generate residual signals for video compression. The invention to be disclosed hereinafter is not limited to the video compression systems shown in FIG. 4.

BRIEF SUMMARY OF THE INVENTION

A method and apparatus for an image or video coding system are disclosed, wherein the corresponding image or video data comprises multiple channels. In one embodiment of the present invention, in an image encoder or a video encoder, residue generation process is applied to image or video data to generate residue data and a residue transform is applied to the residue data. The residue transformed data is then processed by entropy coding to generate a compressed bitstream. A set of integer operations is applied to the residue data across the input channels to generate residue transformed data having multiple output channels. In one embodiment, the first output channel of the residue transformed data is related to the difference between residue data from two different channels. The second output channel of the residue transformed data is related to the difference between a first average and the residue data of the third channel, wherein the first average corresponds to the truncated or rounded average of the residue data from the two different channels. The third output channel of the residue transformed data is related to the average of the first average and the residue data of the third channel. In one embodiment of a video coding system, a two-dimensional transform and a quantization process are applied to the residue data before the residue transform is applied. In another embodiment for a video coding system, the two-dimensional transform and the quantization process is applied to the residue transformed data before entropy coding is applied. The residue generation process for the image encoder comprises spatial prediction, frequency transform, or both spatial prediction and frequency transform. The residue generation process for the video encoder comprises Intra prediction or Inter prediction. The compressed data from multiple channels can be interleaved into a single bitstream.

A method and apparatus incorporating embodiments of the present invention for an image or video decoding system are also disclosed, wherein the corresponding image or video data comprises multiple channels. The compressed bitstream is received and decoded by entropy decoder to recover residue transformed data. Inverse residue transform is then applied to the residue transformed data to recover residue data and the reconstruction process is applied to the residue data to generate a reconstructed version of the original image or video data. A set of integer operations is applied to the residue data across the input channels to generate residue transformed data having multiple output channels. In one embodiment, the first output channel of the residue transformed data is related to the difference between the residue data from two different channels. The second output channel of the residue transformed data is related to the difference between a first average and the residue data of the third channel, wherein the first average corresponds to the truncated or rounded average of the residue data from the two different channels. The third output channel of the residue transformed data is related to the average of the first average and the residue data of the third channel. For the image decoder, the reconstruction process comprises spatial reconstruction, inverse frequency transform, or both spatial reconstruction and inverse frequency transform. The spatial reconstruction and inverse frequency transform are associated with the spatial prediction and frequency transform used in the image encoder respectively. For the video decoder, the reconstruction process comprises Intra reconstruction or Inter reconstruction, wherein the Intra reconstruction performs the reverse processing corresponding to the Intra prediction on the video encoder side and Inter reconstruction performs the reverse processing corresponding to the Inter prediction on the video encoder side. An inverse two-dimensional transformation and an inverse quantization process may be applied to the data before the inverse residue transform or after the inverse residue transform depending on whether the corresponding two-dimensional transformation and the quantization process is applied before or after the residue transform on the video encoder side.

BRIEF DESCRIPTION OF THE DRAWINGS

FIG. 1 illustrates an exemplary block diagram of a conventional image coding system with three channels.

FIG. 2 illustrates an exemplary block diagram of a conventional video transmission system for video interface between a transmitter and a receiver with three channels.

DETAILED DESCRIPTION OF THE INVENTION

As mentioned before, the conventional color conversion process converts original image or video data from the primary color space into a luminance/chrominance space. While the image or video data in the luminance/chrominance space renders an efficient color representation, there is still high degree of correlation among different channels in the luminance/chrominance format. Accordingly, the present invention exploits the redundancy among different channels in the residual signals using a residue transform. Nevertheless, the present invention can be applied to any image or video having multiple input channels. For example, the present invention can also be used for reside data associated with RGB channels.

Figure 5:
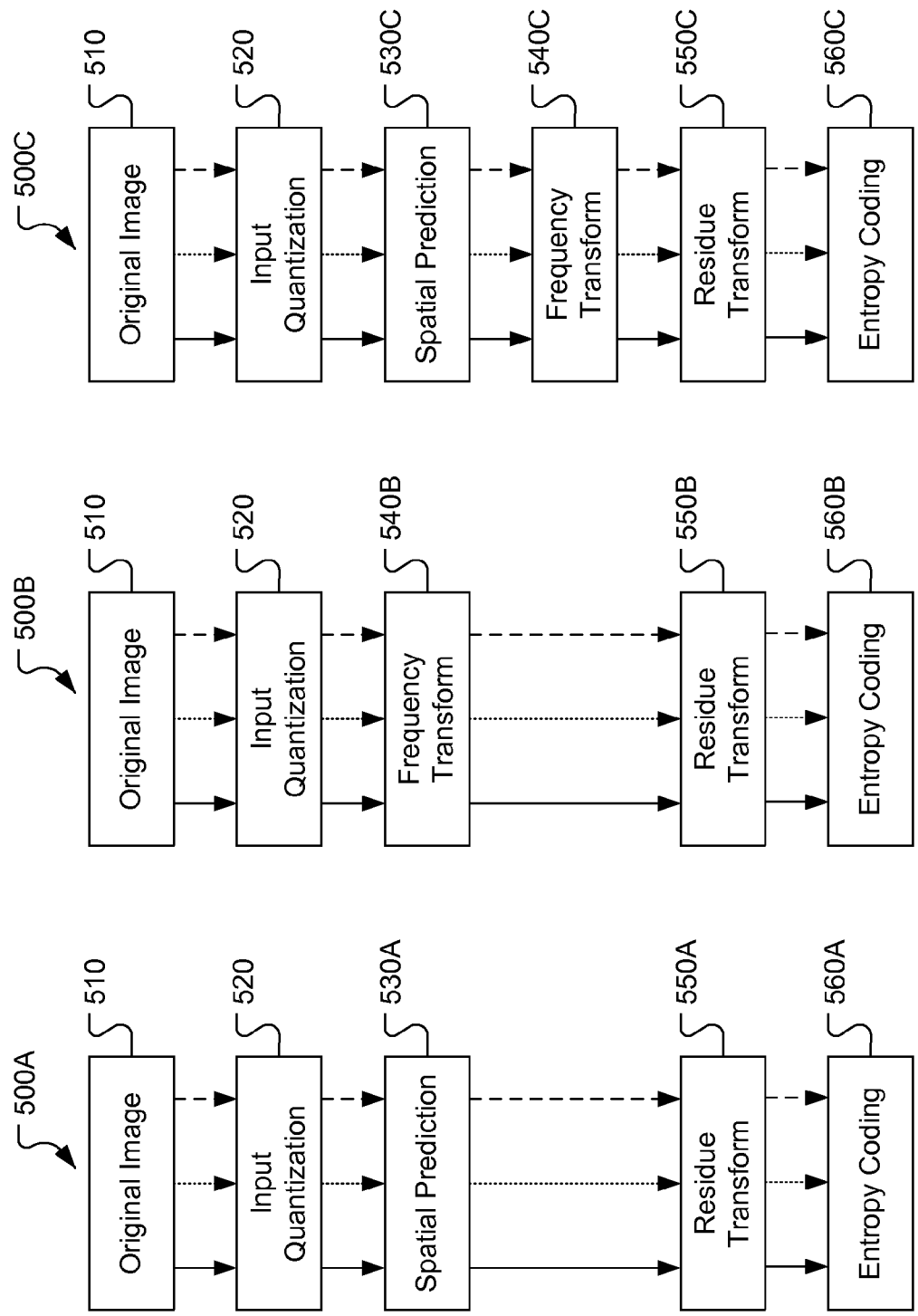
FIG. 5 illustrates examples of a processing flow corresponding to an image encoding system incorporating an embodiment of the present invention, where the residue transform is applied to the residue data.

One embodiment of the present invention is illustrated in FIG. 5 for an image compression system. System 500A corresponds to a compression system based on spatial prediction. Original image 510 with three channels is processed by input quantization 520 and spatial prediction 530A to generate residual signals. The residual signals are then processed by residue transform 550A to generate residue transformed signals, which are compressed by entropy coding 560A to generate compressed data. System 500A as shown in FIG. 5 further reduces redundancy among different channels using the residue transform and achieves higher compression efficiency. System 500B corresponds to a compression system based on frequency transform. Original image 510 with three channels is processed by input quantization 520 and frequency transform 540B to generate residual signals. The residual signals are then processed by residue transform 550B to generate residue transformed signals, which are compressed by entropy coding 560B to generate compressed data. System 500C corresponds to a compression system based on spatial prediction and frequency transform. Original image 510 with three channels is processed by input quantization 520, spatial prediction 530C and frequency transform 540C to generate residual signals. The residual signals are then processed by residue transform 550C to generate residue transformed signals, which are compressed by entropy coding 560C to generate compressed data. Before the residue transformed signals are encoded by entropy coding, a quantization process separate from input quantization 520 may be applied as a means for bit rate control. This quantization process may be embedded in the residue transform as part of the function of the residue transform. When the quantization step size is large, the quantization process may introduce quantization errors which will appear as coding noise in the reconstructed image.

Figure 3:
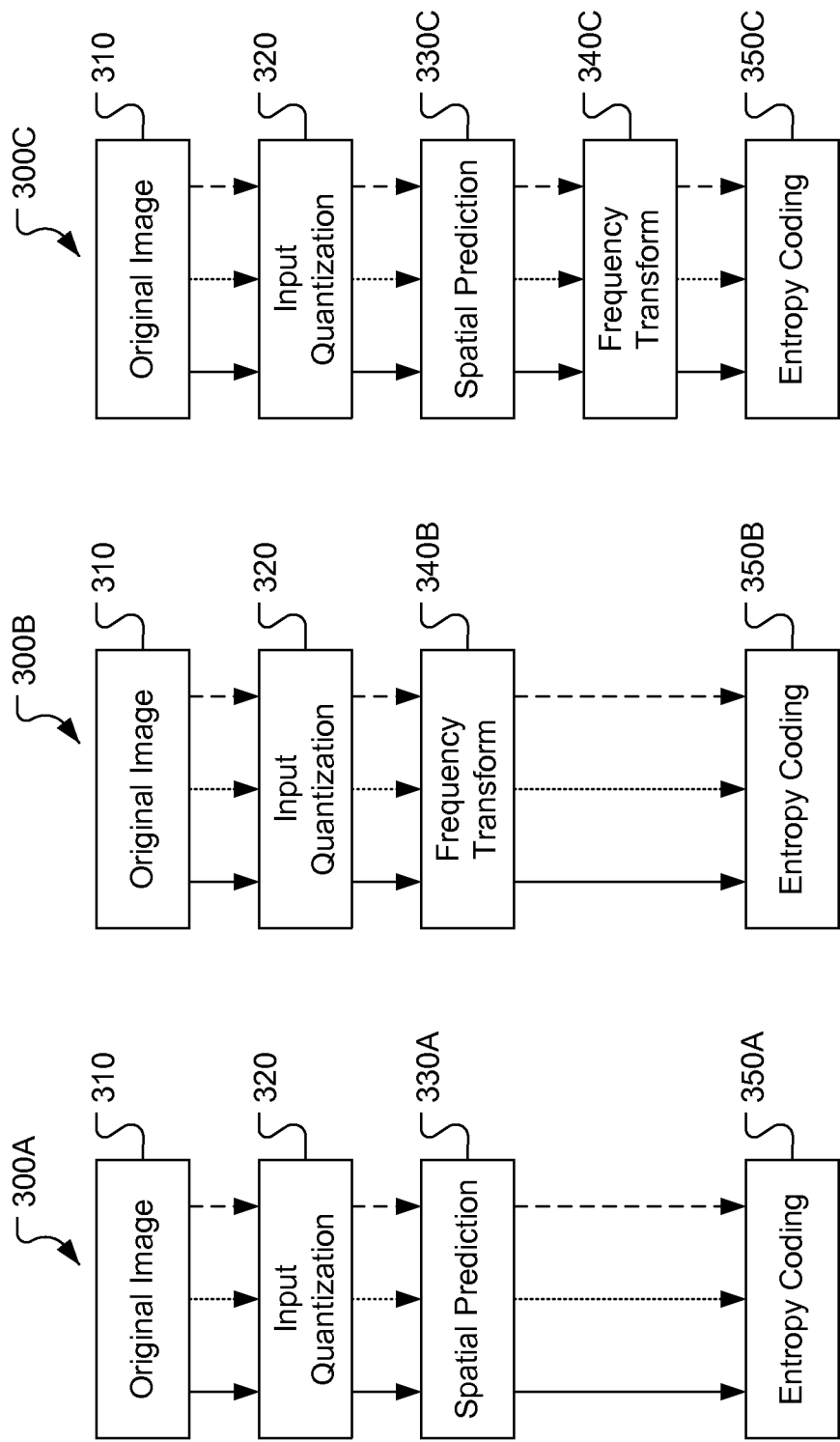
FIG. 3 illustrates examples of a processing flow corresponding to a conventional image coding system with three channels using spatial prediction, frequency transform, or both spatial prediction and frequency transform to generate residue data.
Figure 4:
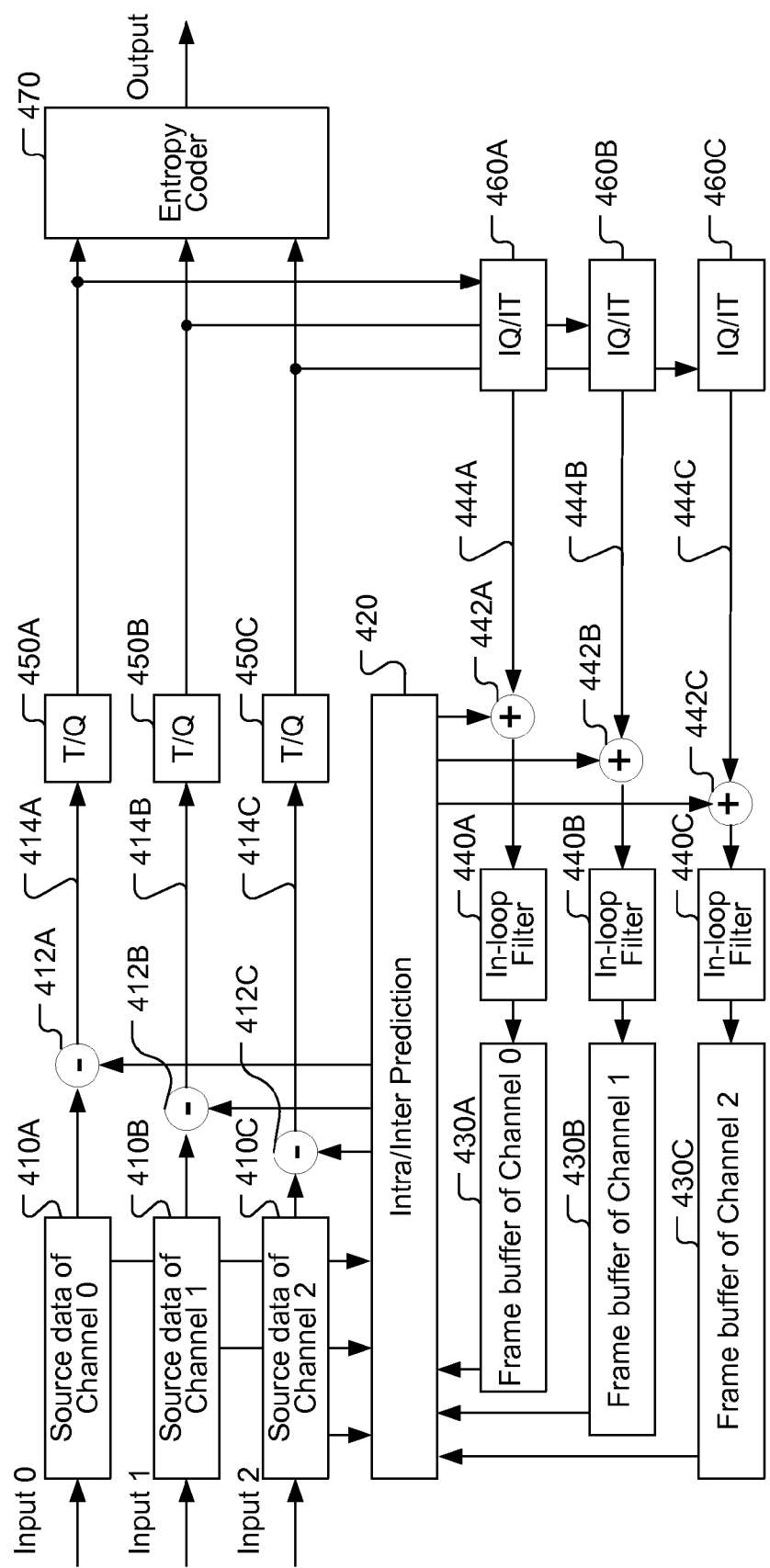
FIG. 4 illustrates an exemplary block diagram of a conventional video encoding system with three channels, where Intra/Inter prediction is used to generate residue data.
Figure 6:
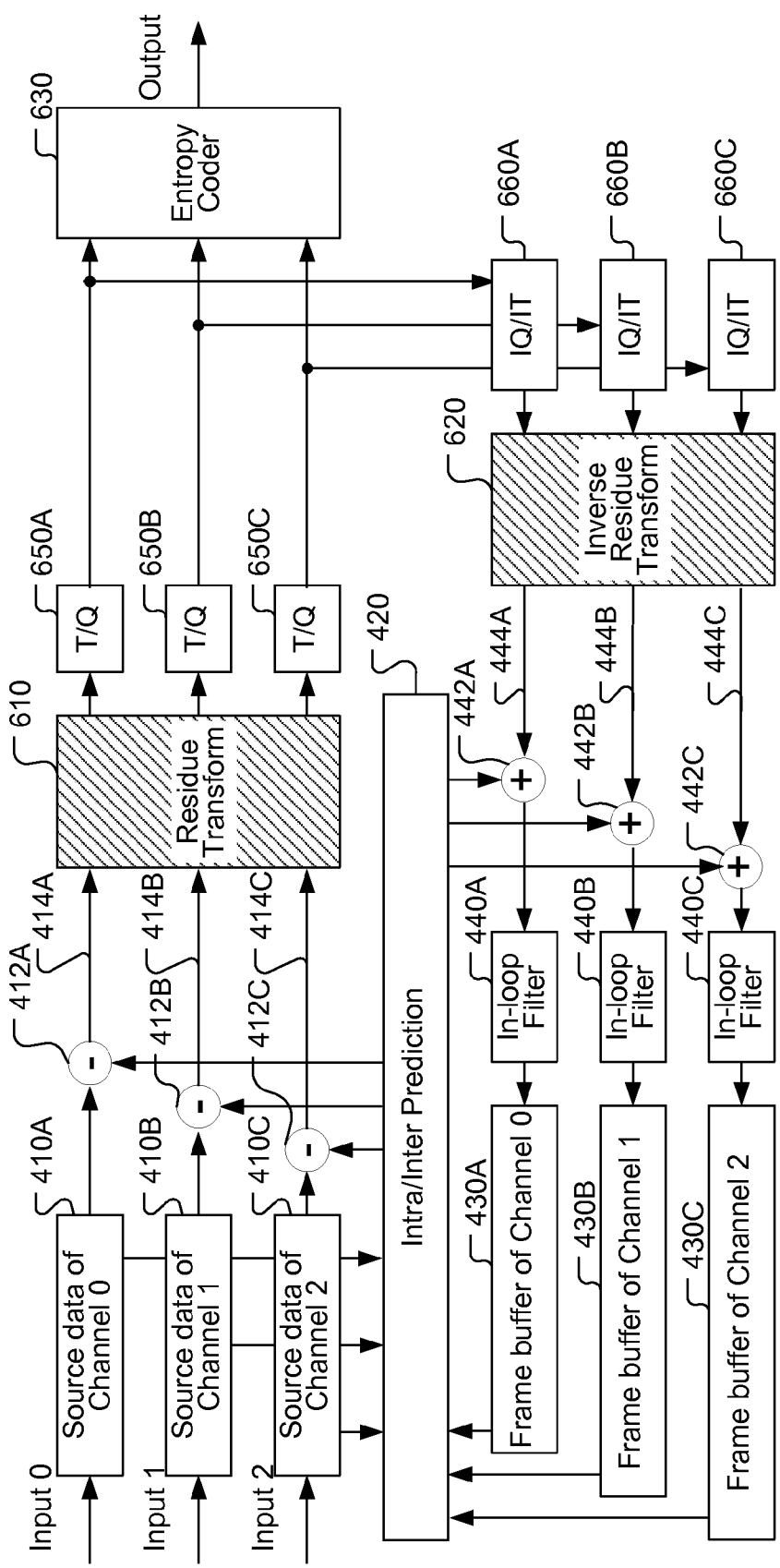
FIG. 6 illustrates an example of a processing flow corresponding to a video encoding system incorporating an embodiment of the present invention, where the residue transform is applied to the residue data.

One embodiment of the present invention is illustrated in FIG. 6 for a video compression system, where the residue transform is applied to the video encoding system in FIG. 4. Residue transform 610 is applied to the residual signals (414A-414C) from subtractors 412A-412C. The transformed residual signals are then processed by T/Q 650A-650C to generate data symbols and the data symbols are compressed using entropy coder 630 to generate compressed bitstream. As mentioned before, reconstructed video also has to be generated on the encoder side for Intra/Inter prediction. Accordingly, the inverse coding process, i.e., IQ/IT 660A-660C is applied to data symbols to recover the transformed residual signals. The transformed residual signals are then processed by inverse residue transform 620 to recover the residual signals. The recovered residual signals (444A-444C) are then added to the previous prediction signals from Intra/Inter prediction 420 to form reconstructed signals using adders 442A-442C. The use of residue transform will be able to reduce redundancy across different channels. Therefore, the system in FIG. 6 incorporating an embodiment of the present invention achieves better compression efficiency.

Figure 7:
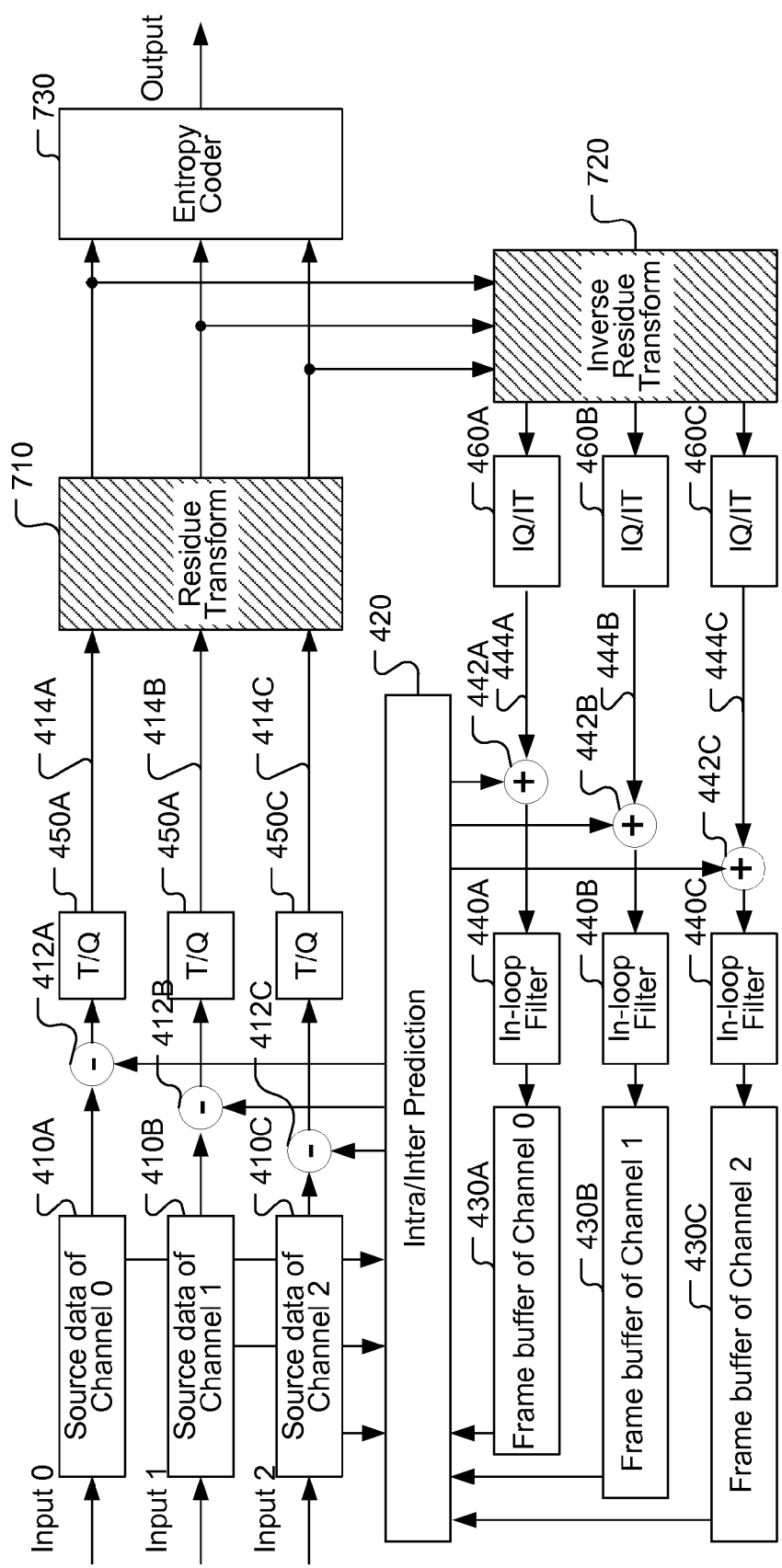
FIG. 7 illustrates another example of a processing flow corresponding to a video encoding system incorporating an embodiment of the present invention, where the residue transform is applied to the two-dimensional transformed and quantized residue data.
Figure 8:
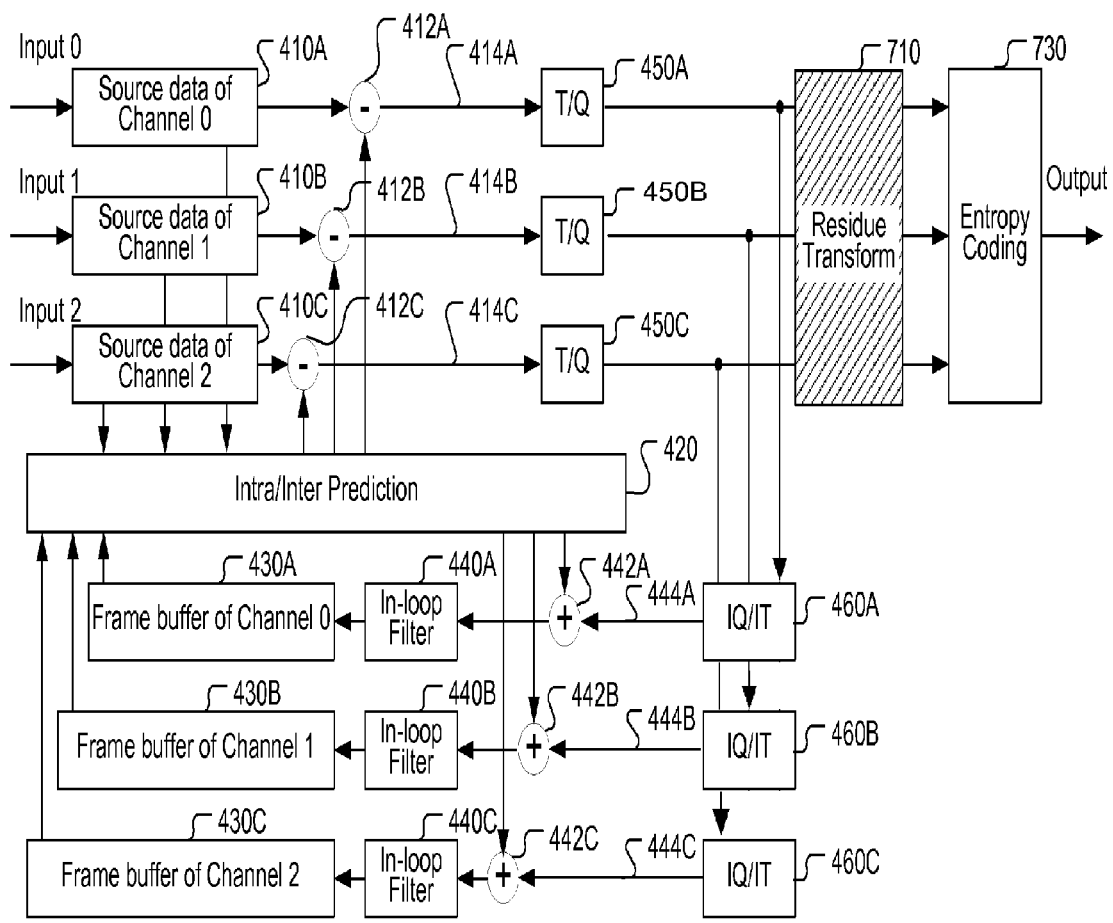
FIG. 8 illustrates a simplified video encoding system of FIG. 7, where the inverse residue transform is eliminated on the encoder side.

Another embodiment of the present invention is illustrated in FIG. 7 for a video compression system, where the residue transform is applied to the video encoding system in FIG. 4. The system structure in FIG. 7 is similar to the system structure in FIG. 6 except that residue transform 710 is applied to residual signals processed by T/Q 450A-450C. The residue transformed signals are then compressed using entropy coder 730 to generated compressed video data output. For the reconstruction loop, inverse residue transform 720 is used to recover T/Q processed signals. The inverse residue transformed signals are then processed by IQ/IT 460A-460C to recover the residual signals. The system in FIG. 7 can be simplified by eliminating the need for the inverse residue transform as shown in FIG. 8. Instead of using the inverse residue transform to recover residue transformed signals corresponding to the T/Q processed signals, the IQ/IT process can receive signals directly from T/Q output as in the case shown in FIG. 4. Accordingly, there is no need for the inverse residue transform in the system in FIG. 8.

The examples shown in FIG. 5 to FIG. 8 use three channels. However, the present invention can be applied to any image or video system having two or more channels. Furthermore, the channels do not necessarily correspond to luminance and chrominance components. The present invention can be applied to other color formats. For example, the channels may correspond to CMYK (cyan, magenta, yellow, and key (black)). In addition, the multiple channels are not necessarily related to color image or video signals only. For example, the multiple channels may correspond to multi-spectral satellite images, where each channel corresponds to a satellite image in a selected spectral band.

Figure 9:
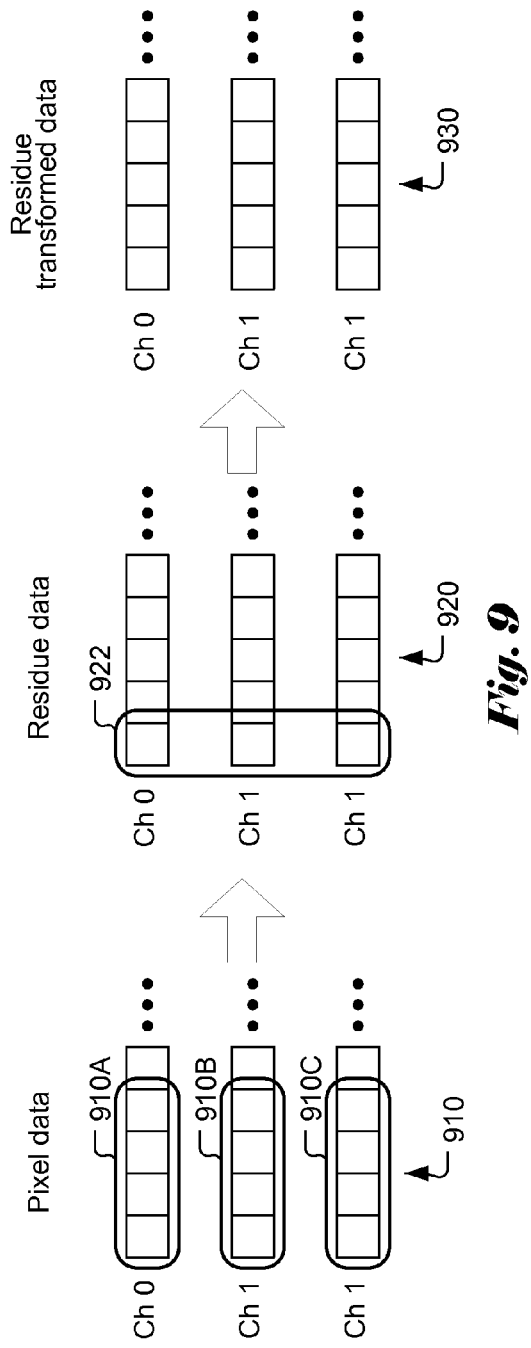
FIG. 9 illustrates an example of a residue generation process and residue transform process according to an embodiment of the present invention.

The residue transform according to the present invention exploits redundancy among different channels on a pixel by pixel basis. In other words, the residue transform corresponds to cross-channel processing. On the other hand, the compression process is applied to each individual channel to exploit spatial and temporal redundancy within each channel. Since the residue transform is operated on the residual signals associated with at least two channels, it may require storing the data of at least one channel. The processing order of the underlying image or video data can be arranged to match the processing order of the residue transform process. For example, the channels can be processing sequentially before the residue-transform stage. However, in the residue-transform stage, parallel processing is applied across the channels. FIG. 9 illustrates characteristic of processing associated with residue generation and residue transform. Block 910 illustrates an example where the residue generation process is applied to individual channels to generate respective residual signals. The residue generation process may be applied to a group of pixels (e.g., 910A-910C) of each channel. The group of pixels may correspond to a block of pixels for spatial prediction, frequency transform or both in FIG. 5. The group of pixels may also correspond to a block of pixels for Intra or Inter prediction as shown in FIG. 6 to FIG. 8. Block 920 illustrates an example of residue transform across three channels, where the residue transform is applied to three samples 922 from three channels. Block 930 illustrates an example of residue transformed data for three channels.

Figure 10:
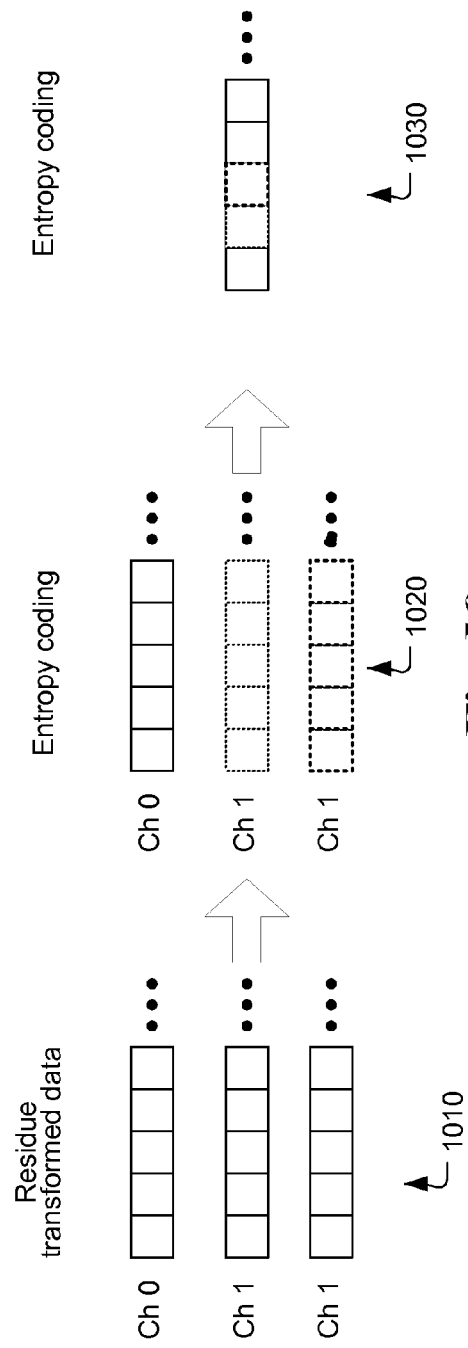
FIG. 10 illustrates an example of an entropy encoding process on the residue transformed data and interleaving outputs corresponding to multiple channels from entropy encoding.

The processing order to generate compressed bitstream can be arranged to match the processing order of residue transform. For example, the bitstream corresponding to the entropy-coding outputs of the residue transformed data can be interleaved to form a single bitstream. This will reduce the buffer size for buffering the residue transformed data prior to compression of the residue transformed data. It may also reduce the buffer size required for data prior to the inverse residue transform in the decompression process. The interleaved bit-stream is more suited for decompression, since the inverse residue transform function needs the data of different channels concurrently. FIG. 10 illustrates various processing stages for a compression system using the residue transform. After residue transformed data 1010 is generated, entropy coding is applied to individual channels as shown in block 1020. The compressed data corresponding to each channel is multiplexed into a single data string as shown in block 1030.

Examples of the residue transform process are shown as follows. $(R_{C0}(x,y), R_{C1}(x,y), R_{C2}(x,y))$ represent the residual signals at location $(x,y)$ of a system with three channels. The residue transform is applied to the residual signals associated with the three channels at each $(x,y)$ location. For convenience, the location notation, $(x,y)$ is dropped from the above representation and $(R_{C0}, R_{C1}, R_{C2})$ is used. The residue transform can be described by a set of integer operations applied to the residue data across the input channels to generate residue transformed data with multiple output channels. In one embodiment, the residue transform outputs $(T_{C0}, T_{C1}, T_{C2})$ are defined as follows:

$$T_{C1}=R_{C1}-R_{C2}; \qquad (1)$$

$$t=(R_{C1}+R_{C2})>>1, \text{ if abs}(T_{C1})>R_{C0}; \qquad (2)$$

$$t=(R_{C1}+R_{C2}+1)>>1, \text{ if abs}(T_{C1})<=R_{C0}; \qquad (3)$$

$$T_{C2}=t-R_{C0}; \qquad (4)$$

and $$T_{C0}=(t+R_{C0})>>1. \qquad (5)$$

In the above equations, operator ">>1" corresponds to right shift by 1. Operation "$(R_{C1}+R_{C2})>>1$" in equation (2) corresponds to the average of $R_{C1}$ and $R_{C2}$ using truncation. Operation "$(R_{C1}+R_{C2}+1)>>1$" in equation (3) corresponds to the average of $R_{C1}$ and $R_{C2}$ using rounding. Similarly, operation "$(t+R_{C0})>>1$" in equation (5) corresponds to the average of t and $R_{C0}$ using truncation. Equation (5) may be modified to "$(t+R_{C0}+1)>>1$" so that $T_{C0}$ becomes the average of t and $R_{C0}$ using rounding. Equations (2) and (3) can be simplified so that t always corresponds to the average of $R_{C1}$ and $R_{C2}$ using rounding or the average of $R_{C1}$ and $R_{C2}$ using truncation. The embodiment of the present invention as shown in equations (1) through (5) is computationally efficient since only simple operations such as addition, subtraction, left shift, and right shift are involved.

In the case that there are only two channels, the residue transform can be modified so that the first transform output corresponds to the difference of the two input channels and the second transform output corresponds to the average of the two input channels. The exemplary residue transforms mentioned above are intended for illustration purpose. The present invention is not limited to the specific operations shown in equations (1) through (5). A person skilled in the art may apply other integer operations including addition, subtraction, left shift or right shift to implement a reversible residue transform. A reversible residue transform refers to a set of operations where an inverse transform process can be applied to the transformed output to fully recover the original input data.

Figure 11:
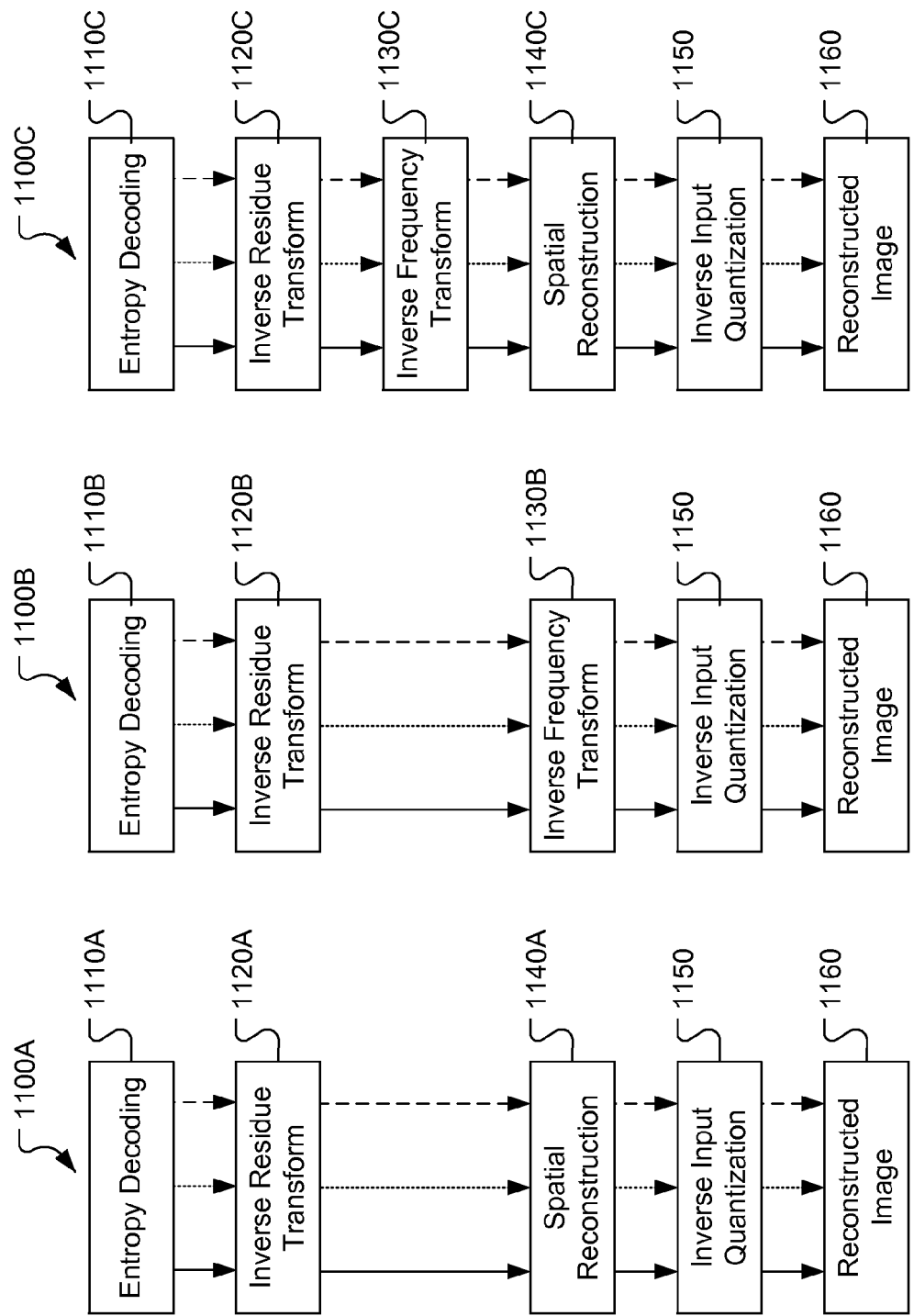
FIG. 11 illustrates examples of a processing flow corresponding to an image decoding system incorporating an embodiment of the present invention, where the inverse residue transform is applied to recover the residue data.

While the systems shown in FIG. 5 to FIG. 8 illustrate image/video encoders incorporating an embodiment of the present invention, the systems for image/video decoders incorporating an embodiment of the present invention can be derived accordingly. FIG. 11 illustrates an exemplary image decoder corresponding to the image encoder in FIG. 5.

Decoder 1100A corresponds to encoder 500A. The compressed data is decoded by entropy decoding 1110A and processed by inverse residue transform 1120A. The recovered residue data is then processed by spatial reconstruction 1140A and inverse input quantization 1150 to generate reconstructed image 1160. Decoder 1100B corresponds to encoder 550B. The compressed data is decoded by entropy decoding 1110B and processed by inverse residue transform 1120B. The recovered residue data is then processed by inverse frequency transform 1130B and inverse input quantization 1150 to generate reconstructed image 1160. Decoder 1100C corresponds to encoder 550C. The compressed data is decoded by entropy decoding 1110C and processed by inverse residue transform 1120C. The recovered residue data is then processed by inverse frequency transform 1130C, spatial reconstruction 1140C and inverse input quantization 1150 to generate reconstructed image 1160.

Figure 12:
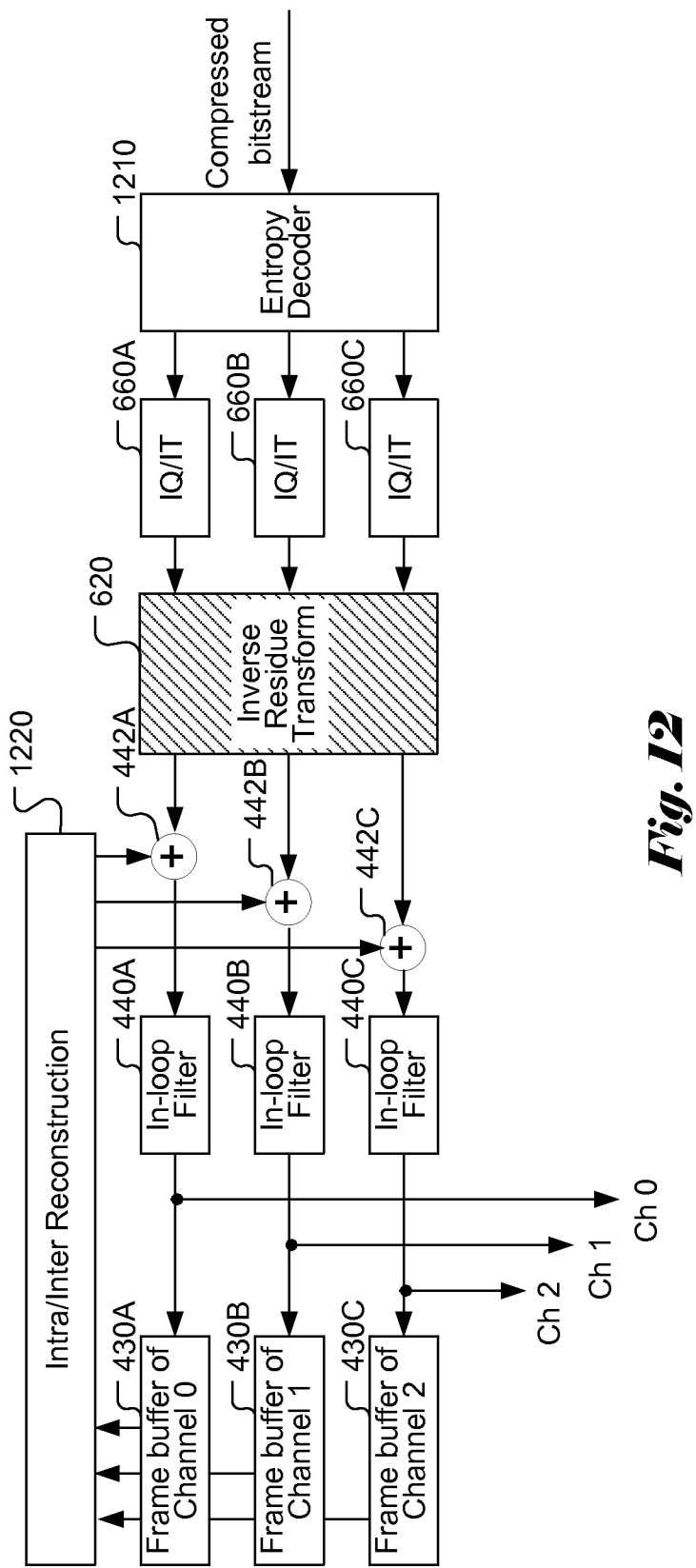
FIG. 12 illustrates an example of a processing flow corresponding to a video decoding system incorporating an embodiment of the present invention, where the inverse residue transform is applied to recover residue transformed data from the inverse two-dimensional transformed and inverse quantized blocks.
Figure 13:
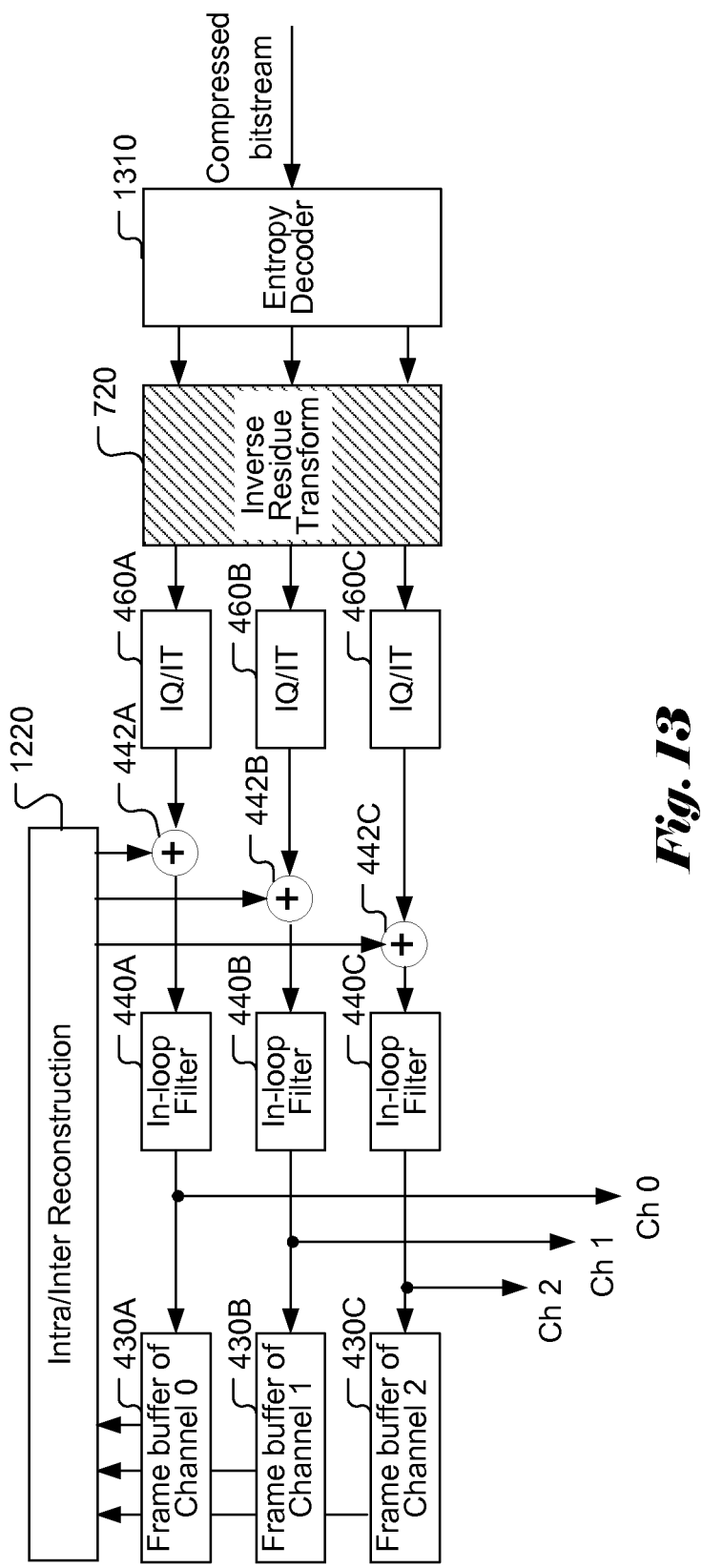
FIG. 13 illustrates an example of a processing flow corresponding to a video decoding system incorporating an embodiment of the present invention, where the inverse residue transform is applied to recover residue transformed data from the entropy decoder.

FIG. 12 illustrates an example of a video decoder corresponding to the video encoder in FIG. 6. Most blocks for the video decoder are already used on the video encoder to reconstructed reference pictures for Intra/Inter prediction. In FIG. 12, entropy decoder 1210 is used to decode the compressed bitstream. At the video decoder side, Intra/Inter reconstruction 1220 is used instead. The Intra/Inter reconstruction process corresponds to the reverse process of the corresponding Intra/Inter prediction. For example, if motion estimation/compensation is used on the video encoder side for Inter prediction, only motion compensation will be needed on the video decoder side. The remaining processing blocks are the same as those on the encoder side as shown in FIG. 6. The reconstructed video outputs can be tapped from the outputs of in-loop filters 440A through 440C. FIG. 13 illustrates an example of video decoder corresponding to the video encoder in FIG. 7 and FIG. 8. In FIG. 13, entropy decoder 1310 is used to decode the compressed bitstream. Similar to the decoder system of FIG. 12, Intra/Inter reconstruction 1220 is used to form the reconstructed video. The remaining blocks have been used on the encoder side as shown in FIG. 7 and FIG. 8.

Figure 14:
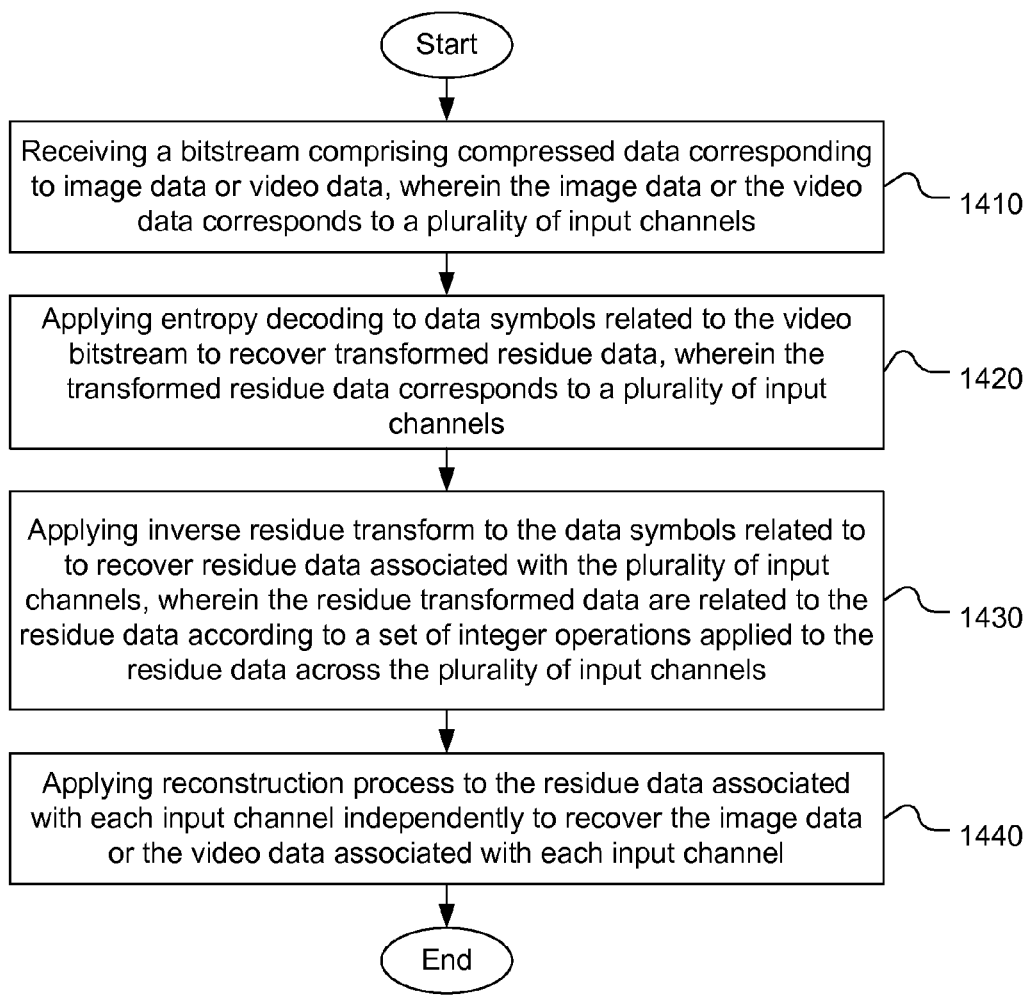
FIG. 14 illustrates an exemplary flowchart of an image or video decoder incorporating an embodiment of the present invention.

FIG. 14 illustrates an exemplary flowchart of an image decoder or video decoder incorporating an embodiment of the present invention. A bitstream comprising compressed data corresponding to image data or video data is received as shown in step 1410, wherein the image data or the video data corresponds to a plurality of input channels. The bitstream may be stored in a media such as a flash memory, an optical disc, computer memory including RAM, DRAM, NVRAM, etc. The bitstream may also be received by a processor from networks or a transmission media. Entropy decoding is then applied to the bitstream to recover transformed residue data as shown in step 1420, wherein the transformed residue corresponds to a plurality of output channels. The inverse residue transform is then applied to the transformed residue data to recover residue data associated with the plurality of input channels as shown in step 1430, wherein the residue transformed data are related to the residue data according to a set of integer operations applied to the residue data across the plurality of input channels. The reconstruction process is applied to the residue data associated with each input channel independently to recover the image data or the video data associated with each input channel as shown in step 1440. Since the residue data is generated by residue generation process such as Intra/Inter prediction of a video coding system, the reconstruction process corresponding to the inverse operation of the corresponding Intra/Inter prediction.

Figure 15:
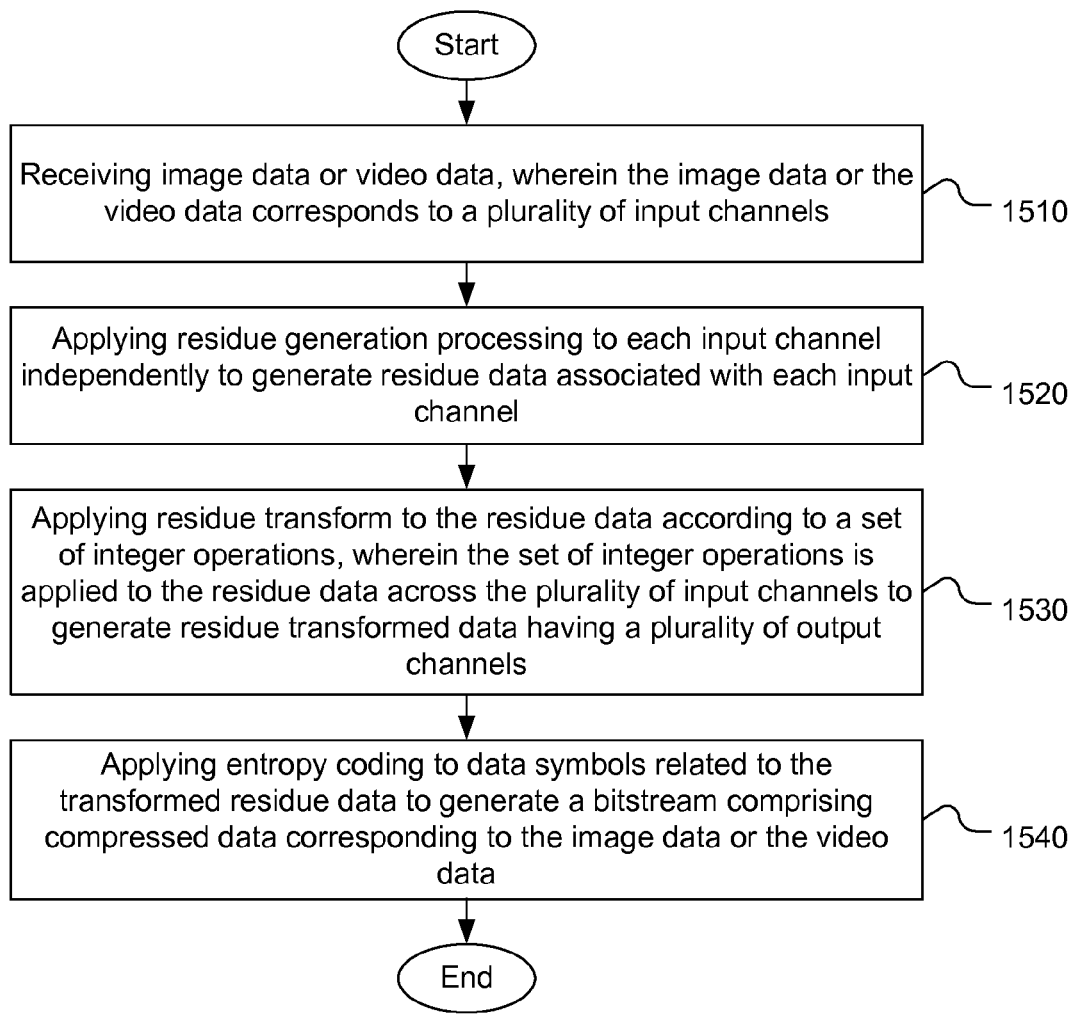
FIG. 15 illustrates an exemplary flowchart of an image or video encoder incorporating an embodiment of the present invention.

FIG. 15 illustrates an exemplary flowchart of an image encoder or video encoder incorporating an embodiment of the present invention. The image data or video data is received as shown in step 1510, wherein the image data or the video data corresponds to a plurality of input channels. The image data or video data may be stored in memory for the encoder and the memory may correspond to RAM, DRAM, NVRAM, etc. The image data or video data may also be received through a processor or interface and the data may be provided by a camera, sensor, or a camera image processor. The residue generation processing is applied to each input channel independently to generate residue data associated with each input channel as shown in step 1520. The residue transform is applied to the residue data according to a set of integer operations as shown in step 1530, wherein the set of integer operations is applied to the residue data across the plurality of input channels to generate residue transformed data having a plurality of output channels. Entropy coding is then applied to the transformed residue data to generate a bitstream comprising compressed data corresponding to the image data or the video data as shown in 1540.

The exemplary flowcharts shown in FIG. 14 and FIG. 15 are for illustration purpose. A skilled person in the art may re-arrange, combine steps or split a step to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of processing image data for an image decoder or video data for a video decoder, the method comprising:
receiving a bitstream comprising compressed data corresponding to image data or video data, wherein the image data or the video data corresponds to a plurality of input channels;
applying entropy decoding to the bitstream to recover data symbols related to residue transformed data, wherein the residue transformed data corresponds to a plurality of output channels;
applying inverse residue transform to first data related to the data symbols to obtain inverse residue transform output related to residue data associated with the plurality of input channels, wherein the residue transformed data are related to the residue data according to a set of integer operations applied to third data related to the residue data across the plurality of input channels, wherein the residue data includes a first residue signal and a second residue signal associated with different input channels of the plurality of input channels, respectively; the residue transformed data includes a first residue transform output and a second residue transform output associated with different output channels of the plurality of output channels, respectively; the third data has a first portion associated with the first residue signal and a second portion associated with the second residue signal; and the first portion and the second portion of the third data are both involved in setting each of the first residue transform output and the second residue transform output; and
applying reconstruction process to second data related to the inverse residue transform output to reconstruct the image data or the video data.

2. The method of claim 1, wherein the inverse residue transform corresponds to lossless processing, wherein recovered residue data generated by said applying inverse residue transform to the residue transformed data is the same as original residue data corresponding to the residue transformed data.

3. The method of claim 1, wherein the reconstruction process corresponds to lossless or lossy processing, wherein the image data or the video data recovered by applying reconstruction process to the residue data is the same as original image data or original video data corresponding to the residue data.

4. The method of claim 1, wherein for the image decoder, the reconstruction process comprises spatial reconstruction, inverse frequency transform, or both of the spatial reconstruction.

5. The method of claim 1, wherein for the video decoder, the reconstruction process comprises first reconstruction based on Intra prediction or second reconstruction based on Inter prediction.

6. The method of claim 1, wherein the first data corresponds to the data symbols and the second data corresponds to the inverse residue transform output, the first data corresponds to the data symbols and the second data corresponds to first output from applying inverse coding process to the inverse residue transform output, or the first data corresponds to second output from applying the inverse coding process to the data symbols and the second data corresponds to the inverse residue transform output, wherein the inverse coding process is applied on an individual input channel basis.

7. The method of claim 6, wherein the inverse coding process corresponds to inverse two-dimensional transform, inverse quantization or both the inverse two-dimensional transform and the inverse quantization.

8. The method of claim 1, wherein the residue transformed data associated with a first output channel is related to difference between first residue data associated with a first input channel and second residue data associated with a second input channel.

9. The method of claim 8, wherein the residue transformed data associated with a second output channel is related to second difference between a threshold and third residue data associated with a third input channel, and wherein the threshold corresponds to first truncated or rounded average of the first residue data and the second residue data.

10. The method of claim 9, wherein the residue transformed data associated with a third output channel is related to second truncated or rounded average of the threshold and the third residue data.

11. A method of processing image data for an image decoder or video data for a video decoder, the method comprising:
receiving a bitstream comprising compressed data corresponding to image data or video data, wherein the image data or the video data corresponds to a plurality of input channels;
applying entropy decoding to the bitstream to recover data symbols related to residue transformed data, wherein the residue transformed data corresponds to a plurality of output channels;
applying inverse residue transform to first data related to the data symbols to obtain inverse residue transform output related to residue data associated with the plurality of input channels, wherein the residue transformed data are related to the residue data according to a set of integer operations applied to the first data across the plurality of input channels; and
applying reconstruction process to second data related to the inverse residue transform output to reconstruct the image data or the video data;
wherein the compressed data associated with different input channels is interleaved in the bitstream, wherein a first portion and a second portion of compressed data associated with one input channel is separated by at least a third portion of compressed data associated with another input channel.

12. A method of processing image data for an image encoder or video data for a video encoder, the method comprising:
receiving image data or video data, wherein the image data or the video data corresponds to a plurality of input channels;
applying residue generation process to each input channel independently to generate residue data associated with each input channel;
applying residue transform to first data related to the residue data according to a set of integer operations, wherein the set of integer operations is applied to the first data across the plurality of input channels to generate residue transformed data having a plurality of output channels, wherein the residue data includes a first residue signal and a second residue signal associated with different input channels of the plurality of input channels, respectively; the residue transformed data includes a first residue transform output and a second residue transform output associated with different output channels of the plurality of output channels, respectively; the first data has a first portion associated with the first residue signal and a second portion associated with the second residue signal; and the first portion and the second portion of the first data are both involved in setting each of the first residue transform output and the second residue transform output; and applying entropy coding to data symbols related to the residue transformed data to generate a bitstream comprising compressed data corresponding to the image data or the video data.

13. The method of claim 12, wherein the residue transform corresponds to lossless processing, wherein the residue data recovered by applying inverse residue transform to the residue transformed data is the same as original residue data corresponding to the residue transformed data.

14. The method of claim 12, wherein the residue generation process corresponds to lossless or lossy processing.

15. The method of claim 12, wherein the residue generation process comprises spatial prediction, frequency transformation, or both of the spatial prediction and the frequency transformation to reduce data correlation associated with the image data of each input channel.

16. The method of claim 12, wherein the residue generation process comprises Intra prediction or Inter prediction to reduce data correlation associated with the video data of each input channel.

17. The method of claim 12, wherein the first data corresponds to the residue data and the data symbols correspond to the residue transformed data, the first data corresponds to the residue data and the data symbols correspond to first output from applying coding process to the residue transformed data, or the first data corresponds to second output from applying the coding process to the residue data and the data symbols correspond to the residue transformed data, wherein the coding process is applied on an individual input channel basis.

18. The method of claim 17, wherein the coding process corresponds to two-dimensional transform, quantization or both the two-dimensional transform and the quantization.

19. The method of claim 12, wherein the residue transformed data associated with a first output channel is related to difference between first residue data associated with a first input channel and second residue data associated with a second input channel.

20. The method of claim 19, wherein the residue transformed data associated with a second output channel is related to second difference between a threshold and third residue data associated with a third input channel, and wherein the threshold corresponds to first truncated or rounded average of the first residue data and the second residue data.

21. The method of claim 20, wherein the residue transformed data associated with a third output channel is related to second truncated or rounded average of the threshold and the third residue data.

22. A method of processing image data for an image encoder or video data for a video encoder, the method comprising:

receiving image data or video data, wherein the image data or the video data corresponds to a plurality of input channels;

applying residue generation process to each input channel independently to generate residue data associated with each input channel;

applying residue transform to first data related to the residue data according to a set of integer operations, wherein the set of integer operations is applied to the residue data across the plurality of input channels to generate residue transformed data having a plurality of output channels; and applying entropy coding to data symbols related to the residue transformed data to generate a bitstream comprising compressed data corresponding to the image data or the video data;

wherein the compressed data associated with different input channels is interleaved in the bitstream, wherein a first portion and a second portion of compressed data associated with one input channel is separated by a third portion of compressed data associated with another input channel.

23. An apparatus of processing image data for an image decoder or video data for a video decoder, the apparatus comprising:

means for receiving a bitstream comprising compressed data corresponding to image data or video data, wherein the image data or the video data corresponds to a plurality of input channels;

means for applying entropy decoding to the bitstream to recover data symbols related to residue transformed data, wherein the residue transformed data corresponds to a plurality of output channels;

means for applying inverse residue transform to first data related to the data symbols to obtain inverse residue transform output related to residue data associated with the plurality of input channels, wherein the residue transformed data are related to the residue data according to a set of integer operations applied to third data related to the residue data across the plurality of input channels, wherein the residue data includes a first residue signal and a second residue signal associated with different input channels of the plurality of input channels, respectively; the residue transformed data includes a first residue transform output and a second residue transform output associated with different output channels of the plurality of output channels, respectively; the third data has a first portion associated with the first residue signal and a second portion associated with the second residue signal; and the first portion and the second portion of the third data are both involved in setting each of the first residue transform output and the second residue transform output; and means for applying reconstruction process to second data related to the inverse residue transform output to reconstruct the image data or the video data.

24. An apparatus of processing image data for an image encoder or video data for a video encoder, the apparatus comprising:

means for receiving image data or video data, wherein the image data or the video data corresponds to a plurality of input channels;

means for applying residue generation process to each input channel independently to generate residue data associated with each input channel;

means for applying residue transform to first data related to the residue data according to a set of integer operations, wherein the set of integer operations is applied to the first data across the plurality of input channels to generate residue transformed data having a plurality of output channels, wherein the residue data includes a first residue signal and a second residue signal associated with different input channels of the plurality of input channels, respectively; the residue transformed data includes a first residue transform output and a second residue transform output associated with different output channels of the plurality of output channels, respectively; the first data has a first portion associated with the first residue signal and a second portion associated with the second residue signal; and the first portion and the second portion of the first data are both involved in setting each of the first residue transform output and the second residue transform output; and means for applying entropy coding to data symbols related to the residue transformed data to generate a bitstream comprising compressed data corresponding to the image data or the video data.

* * * * *